(12) United States Patent
Colson et al.

(10) Patent No.: US 6,181,994 B1
(45) Date of Patent: Jan. 30, 2001

(54) METHOD AND SYSTEM FOR VEHICLE INITIATED DELIVERY OF ADVANCED DIAGNOSTICS BASED ON THE DETERMINED NEED BY VEHICLE

(75) Inventors: James Campbell Colson, Austin, TX (US); Neal Alewine, Lake Worth, FL (US)

(73) Assignee: International Business Machines Corporation, Armonk, NY (US)

( * ) Notice: Under 35 U.S.C. 154(b), the term of this patent shall be extended for 0 days.

(21) Appl. No.: 09/287,846

(22) Filed: Apr. 7, 1999

(51) Int. Cl.[7] .............................. G01M 17/00; H04B 1/38
(52) U.S. Cl. ................................................ 701/33; 701/31
(58) Field of Search ................................... 701/29, 33, 31

(56) References Cited

U.S. PATENT DOCUMENTS

| | | | |
|---|---|---|---|
| 5,442,553 | * 8/1995 | Parrillo | 455/420 |
| 5,732,074 | * 3/1998 | Spaur et al. | 370/313 |
| 5,758,300 | * 5/1998 | Abe | 455/456 |
| 5,781,871 | * 7/1998 | Mezger et al. | 455/456 |
| 5,922,037 | * 7/1999 | Potts | 701/29 |
| 6,025,776 | * 2/2000 | Matsuura | 340/438 |
| 6,032,089 | * 2/2000 | Buckley | 701/36 |

FOREIGN PATENT DOCUMENTS 0 685 723 A2 * 12/1995 (EP).
10-194095 * 7/1998 (JP).

OTHER PUBLICATIONS

Jameel et al.; Web on wheels: toward Internet–enabled cars; IEEE–Computer; vol. 31, iss. 1; Jan. 1998; pp. 69–76.*
Jameel et al.; Internet multimedia on wheels: connecting cars to cyberspace; IEEE–ITSC '97; Nov. 1997; pp. 637–642.*
Lind et al.; The network vehicle– a glimpse into the future of mobile multi–media; IEEE–DASC '98; Oct. 1998; pp. I21–1–I21–8.*

* cited by examiner

Primary Examiner—Michael J. Zanelli
(74) Attorney, Agent, or Firm—Paul Kraft; Leslie A. Van Leeuwen

(57) ABSTRACT

The present invention allows advanced diagnostics to be loaded into a vehicle on demand with results being sent back to the diagnostic center, possibly requiring a more refined selection of diagnostics based on the results of the previous tests. Thus, a new generation of network vehicle communications with diagnostic centers, via cellular telephone, wireless communications and Internet access via wireless communication link, provide a rich networking topology that allows onboard computers or microprocessors to obtain problem diagnosis information and data while on the road.

18 Claims, 5 Drawing Sheets

DOCKING STATION

FIG. 4 WIRELESS COMMUNICATION

TYPICAL WIRELESS NETWORK

METHOD AND SYSTEM FOR VEHICLE INITIATED DELIVERY OF ADVANCED DIAGNOSTICS BASED ON THE DETERMINED NEED BY VEHICLE

TECHNICAL FIELD

The present invention involves the ability to deliver diagnostic information from a vehicle to a diagnostics service center upon request, as well as the ability to download more advanced diagnostic routines into the vehicle, based on need determined by the vehicle.

BACKGROUND OF RELATED ART

When a vehicle is experiencing operational problems, or there is a need for information in general about operating conditions within the vehicle, it is a common practice to drive the vehicle (i.e. car, truck, RV, van or construction vehicle) to a "vehicle diagnosis center". These centers are equipped with the necessary advanced computer technology to allow the vehicle's onboard computer sensors to interact with the center's advanced diagnostic programs to access and pin-point the exact problem, thus facilitating the correction of the problem or providing the needed information on the status of the operation of the vehicle.

Currently, network connected vehicle devices only allow simple local upgrading of diagnostic information. The cost constraints of the device do not allow for sophisticated diagnostic programs. The sophisticated programs to do diagnostics must currently be run at a diagnostic center location. This, as noted above, requires the user to drive to a diagnostic center in order to get this form of sophisticated diagnostic program service.

The present invention overcomes these deficiencies and allows advanced diagnostics to be loaded on demand with results being sent back to the diagnostic center; possibly requiring a more refined selection of diagnostics based on the results of the previous tests.

SUMMARY OF THE PRESENT INVENTION

The present invention involves the ability (method and system) to deliver diagnostic information from a vehicle to a diagnostic service center upon request, as well as the ability to download more advanced diagnostic routines into the vehicle from the diagnostic center, based on need determined by the vehicle. The vehicle does not have to be physically present at the diagnostic service center.

The present invention allows advanced diagnostics to be loaded on demand with the results being sent back to the diagnostic center, possibly requiring the more refined selection of diagnostics based on the results of the previous tests.

As noted, the present invention exhibits the ability to deliver diagnostic information from the vehicle to the service center upon request and the ability to download more advanced diagnostic routines into the vehicle based on the need as determined by the vehicle. Based on this, the network delivery of some applications will be important to cost effectiveness. This invention covers the specific case of enabling the vehicle to perform advanced diagnostics routines "on-demand" without the need to continually store them inboard the vehicle. This has the advantage of more efficient storage while targeting more advanced diagnostics based on previous diagnostic results.

The vehicle's computer/microprocessors interact with the diagnostic service center via the network, either by WAN, LAN or wireless network communication techniques. This can be accomplished by microprocessors built into the vehicle's diagnostics system or computer (i.e. portable, laptop or notebook commuter via a docking station) within the vehicle communicating via the network with the diagnostics center.

While a vehicle diagnostic microprocessor can be linked to the diagnostic center's diagnostic computer via the network. (LAN, WAN and wireless networks) a computer docking station within the vehicle is another means by which the vehicle's microprocessors or computers can communicate with the distant diagnostic center. If a docking station in the vehicle is used, it can house a portable, laptop or notebook computer that contains a power connection, expansion slots and connections to peripherals, such as a monitor, printer, full-sized keyboard and a mouse. The purpose of a docking station is to turn the laptop or notebook computer into a desktop PC machine and allow users the convenience of using such peripherals as a monitor and a full sized keyboard. Thus, the current docking stations can be considered as a cabinet containing a disk drive, video circuits and special receptacles designed to house a portable computer. When the portable or laptop computer is inserted into the space provided in the docking station, the portable or laptop computer, can use devices attached to the docking station for communication and interaction with the diagnostic center's computers.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 5:
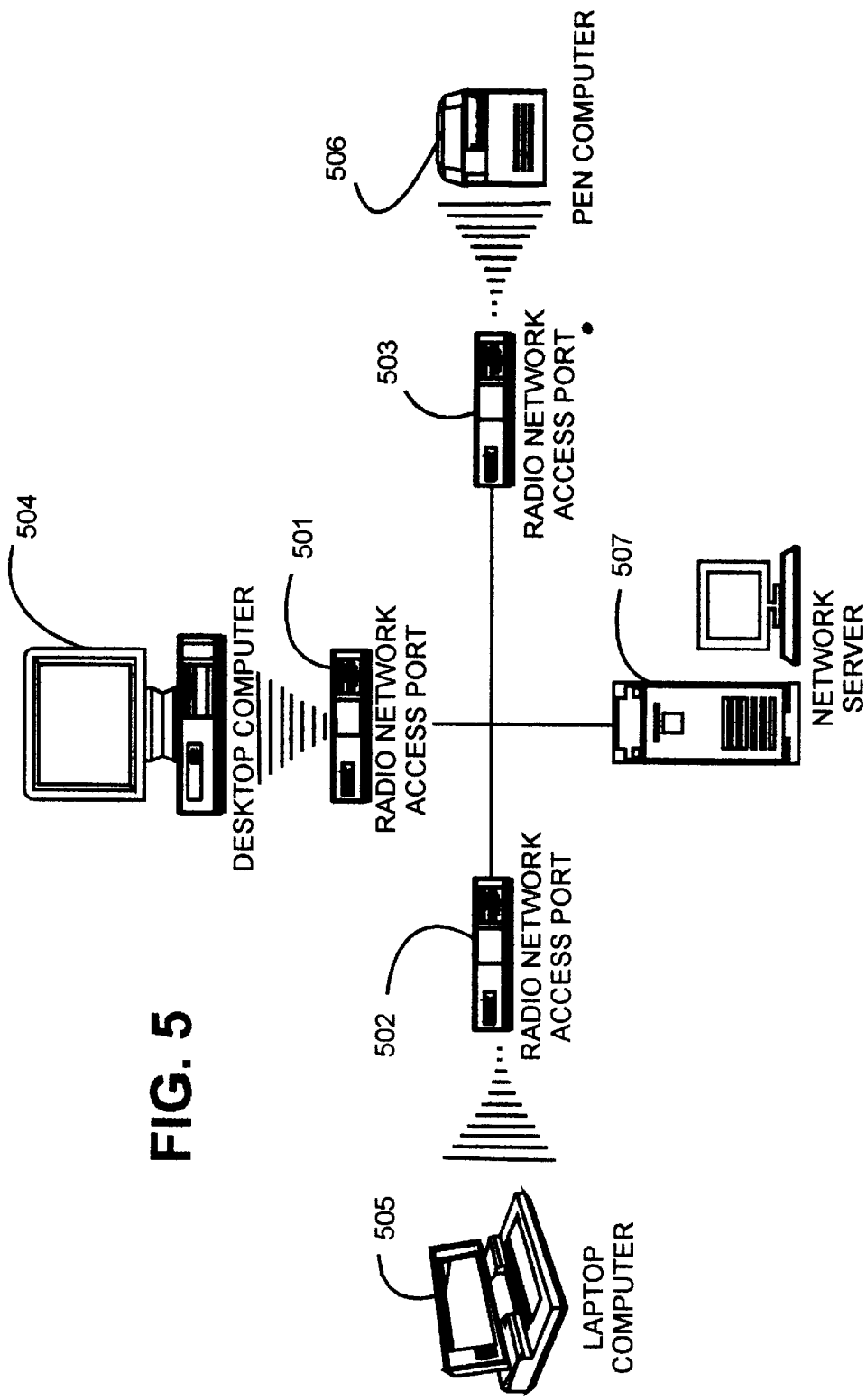
FIG. 5 represents a typical wireless network demonstrating the various radio network access ports for the network.

At this point it would be appropriate and helpful to review the topic of wireless networks to better understand the present invention. In wireless network communications, data is carried over radio waves or by means of infrared light. There are a plethora of standards built around IEEE 802.11 standards and TCP/IP protocol. It is possible to build a network that runs over any media coaxial cable, unshielded twisted-pair wire, glass fiber and, of course, radio waves. Wireless networks are versatile ways to transfer data. They can run over a variety of radio waves, from infrared spectrum to cellular phone bands. Typically, wireless LANs or WANs are not totally wireless, although completely wireless LANs do exist. Most often, wireless LANs are built in a way similar to cellular networks, with several wireless access points connected to a standard Ethernet, as shown in FIG. 5.

Infrared wireless technology is more often used in a single office where the user moves around the room with a laptop. The infrared is a line-of-sight technology.

Out-of-office networking technology, as represented by radio modems, are quite amenable for use in the present invention. It is referred to as cellular digital packet data (CDPD), which enables a user to send data packets using a cellular network, similar to what is used for cellular telephones.

The present invention provides the ability to deliver diagnostic information from a vehicle to a diagnostics service center upon request, as well as the ability to download more advanced diagnostic routines into the vehicle based on need determined by the results of previous tests of the vehicle. This is provided via the computer wireless network, linking the vehicle computer or microprocessor with the diagnostic center.

In addition, the present invention also covers server initiated transfer of information back to the vehicle. This can be considered a "Push" effect, where in networks and the Internet, data, information or programs are sent from a server to the client (i.e. the vehicle) at the instigation of the server. This is to be compared to the "pull" effect, where a client retrieves data from a network server at the instigation of the client.

In the present case, for example, results from vehicle analysis are sent to the network server. The server determines when to load more diagnostics and initiate transfer. Alternately, the server can send information back to the car at a predetermined set date (i.e. every 10 days).

Thus, a new generation of network vehicle communications with diagnostic centers via cellular telephone, wireless communications and Internet access, via wireless communication link, provides a rich networking topology that allows onboard computers or microprocessors to obtain problem diagnosis information and data while on the road.

Figure 1:
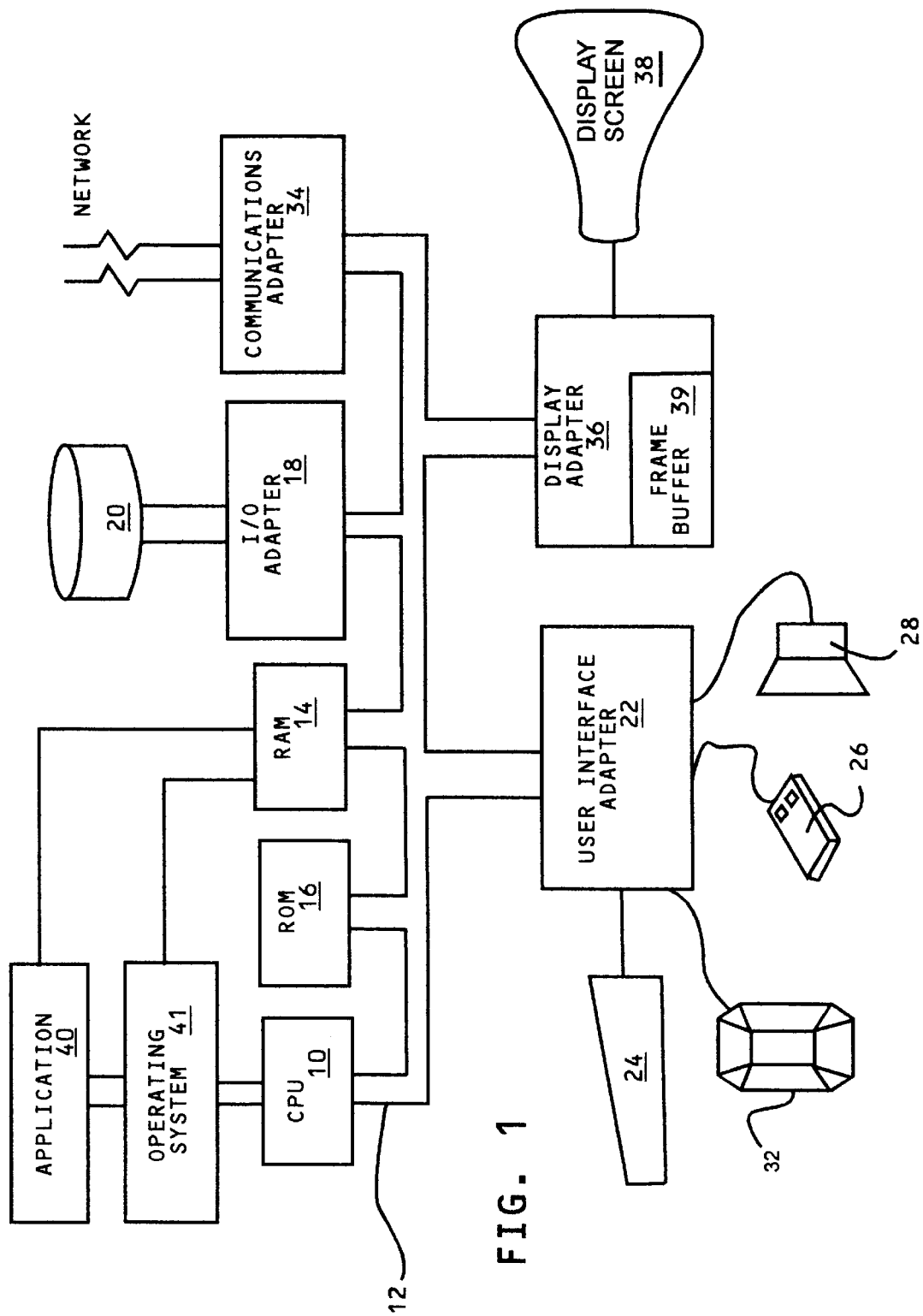
FIG. 1 is provided for purposes of general back-ground. It shows a general block diagram of a computer data processing system, including a central processing unit and network connections via a communications adapter which is capable of implementing the present invention.

FIG. 1 is provided merely for purposes of general background. It represents a typical block diagram of a data processing system including a central processing unit and network connections via a communications adapter, which is capable of implementing the present invention.

A central processing unit (CPU) 10, such as one of the PowerPC microprocessors available from International Business Machines Corporation (IBM) (PowerPC is a trademark of International Business Machines Corporation) is provided and interconnected to various other components by system bus 12. An operating system 41 runs on CPU 10 and provides control and is used to coordinate the function of the various components of FIG. 1. Operation system 41 may be one of the commercially available operating systems such as DOS, or the OS/2 operating system available from IBM (OS/2 is a trademark of International Business Machines Corporation). A program application, such as the program in the above-mentioned VRT platform 40, runs in conjunction with operating system 41 and provides output calls to the operating system 41 which implements the various functions to be performed by the application 40.

A read only memory (ROM) 16 is connected to CPU 10, via bus 12 and includes the basic input/output system (BIOS) that controls the basic computer functions, Random access memory (RAM) 14, I/O adapter 18 and communications adapter 34 are also interconnected to system bus 12. It should be noted that software components, including the operating system 41 and application 40, are loaded into RAM 14, which is the computer system's main memory. I/O adapter 18 may be a small computer system interface (SCSI) adapter that communicates with the disk storage device 20, i.e. a hard disk drive. Communications adapter 34 interconnects bus 12 with a network enabling the data processing system to communicate with other such systems over a LAN, WAN or the like. I/O devices are also connected to system bus 12 via user interface adapter 22 and display adapter 36. Keyboard 24, trackball 32, mouse 26 and speaker 28 are all interconnected to bus 12 through user interface adapter 22. Display adapter 36 includes a frame buffer 39 which is a storage device that holds a representation of each pixel on the display screen 38. Images may be stored in frame buffer 39 for display on monitor 38 through various components, such as a digital to analog converter (not shown) and the like. By using the aforementioned I/O devices, a user is capable of inputting information to the system through the keyboard 24, trackball 32 or mouse 26 and receiving output information from the system via sneaker 28 and display 38.

Figure 2:
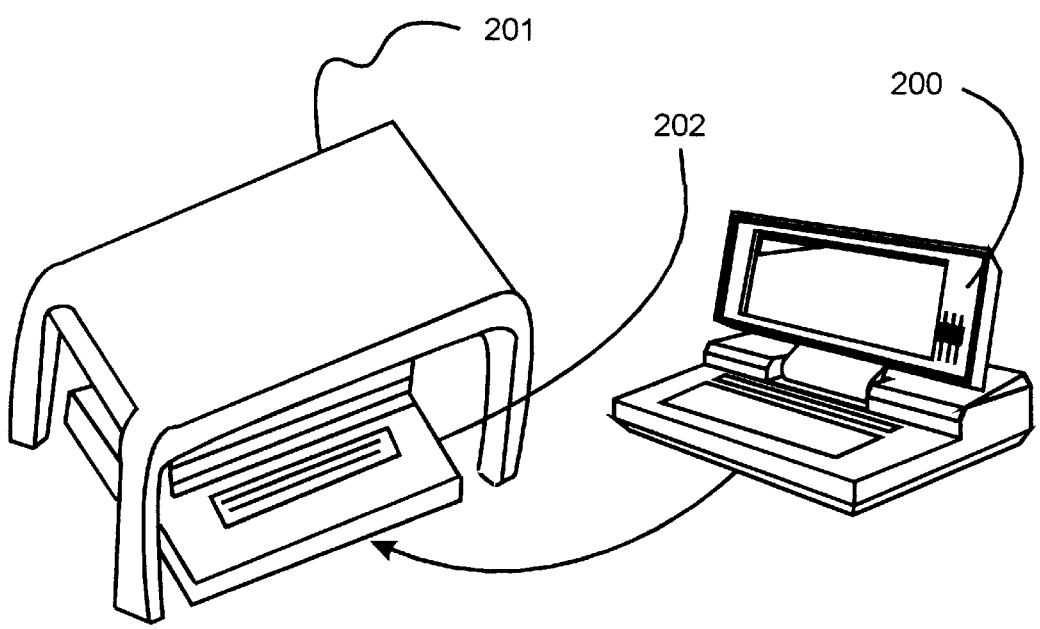
FIG. 2 represents a drawing of a typical office or business docking station.

FIG. 2 represents a drawing of a typical docking station that may be employed for the implementation of the present invention. FIG. 2 at 200 represents a typical laptop PC. FIG. 2 at 201 represents the cabinet-like structure of the workstation. FIG. 2 at 202 indicates where the sortable PC 200 is inserted into the space on 202 in the docking station 201. The portable or laptop computer can then use devices attached to the docking station.

Figure 3:
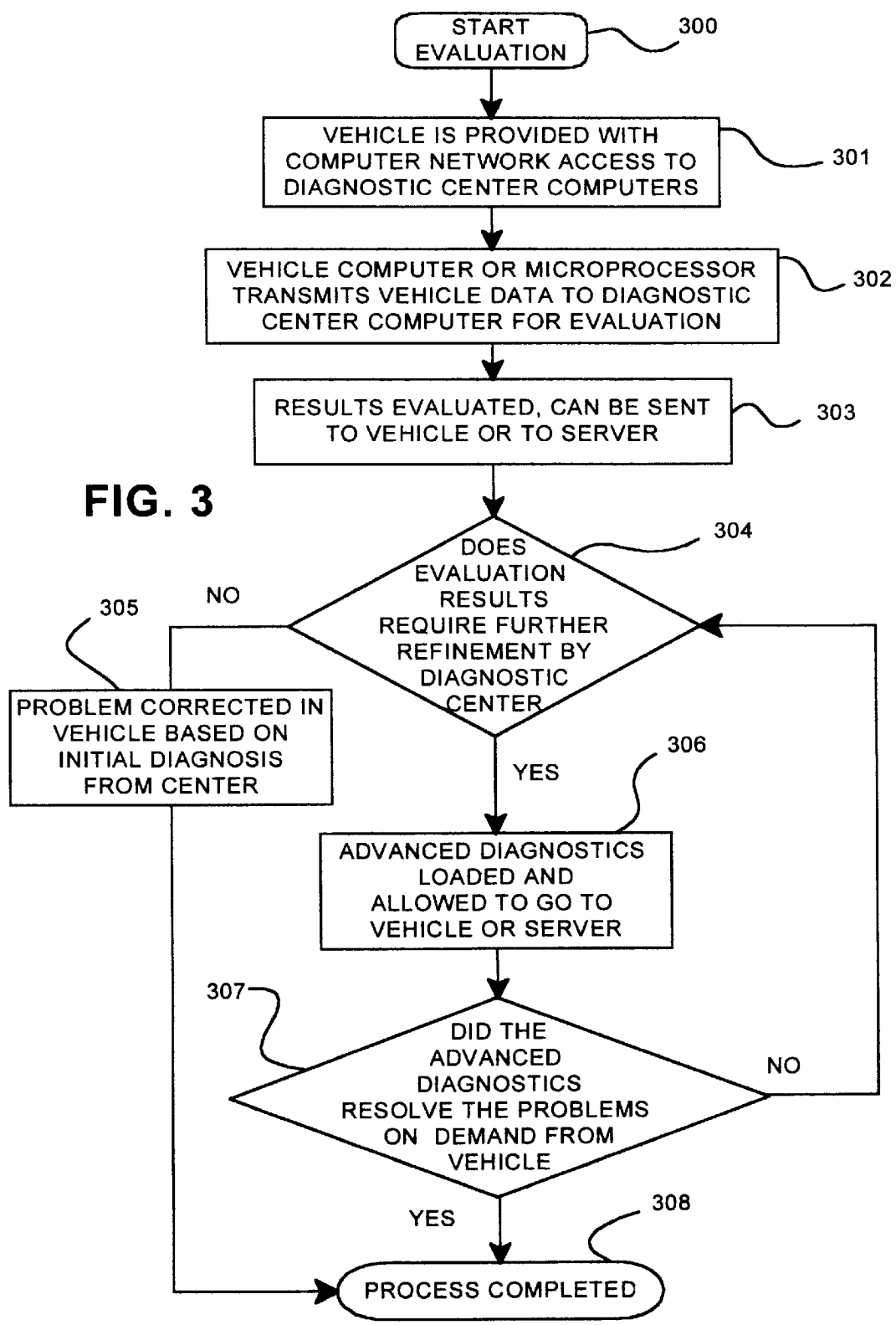
FIG. 3 represents a flowchart for the process of the present invention.

FIG. 3 represents a flowchart of the method employed for the present invention. This method or process is initiated at 300. The vehicle is provided with computer access to the diagnostic center via wireless communication techniques at 301. The vehicle computer or microprocessor then transmits vehicle performance data to the diagnostic center computer for evaluation at 302. The results are then evaluated at 303 and can then be sent via wireless techniques to the vehicle or to the network server.

The query at 304 is then raised as to whether the evaluation result requires further refinement by the diagnostic center.

If the answer at 304 is no, and the problem is corrected in vehicle 305, then the process proceeds directly to 308 where it is completed. For example, a light bulb is out. However, if the answer to query 304 is yes, then advanced diagnostics are loaded and allowed to go to the vehicle or server in step 306.

A query is once again raised at 307 as to whether the advanced diagnostics information has supplied the vehicles needs. If the answer in this case is yes, the complex problems within the vehicle are satisfactorily resolved and the process is completed at 308. However, if the answer to 307 is no and once again further advanced and refined diagnostics are required, the process is again returned to 304 and the subsequent steps repeated until the needs of the vehicle are satisfied. An example might be an intermittent light bulb failure.

Figure 4:
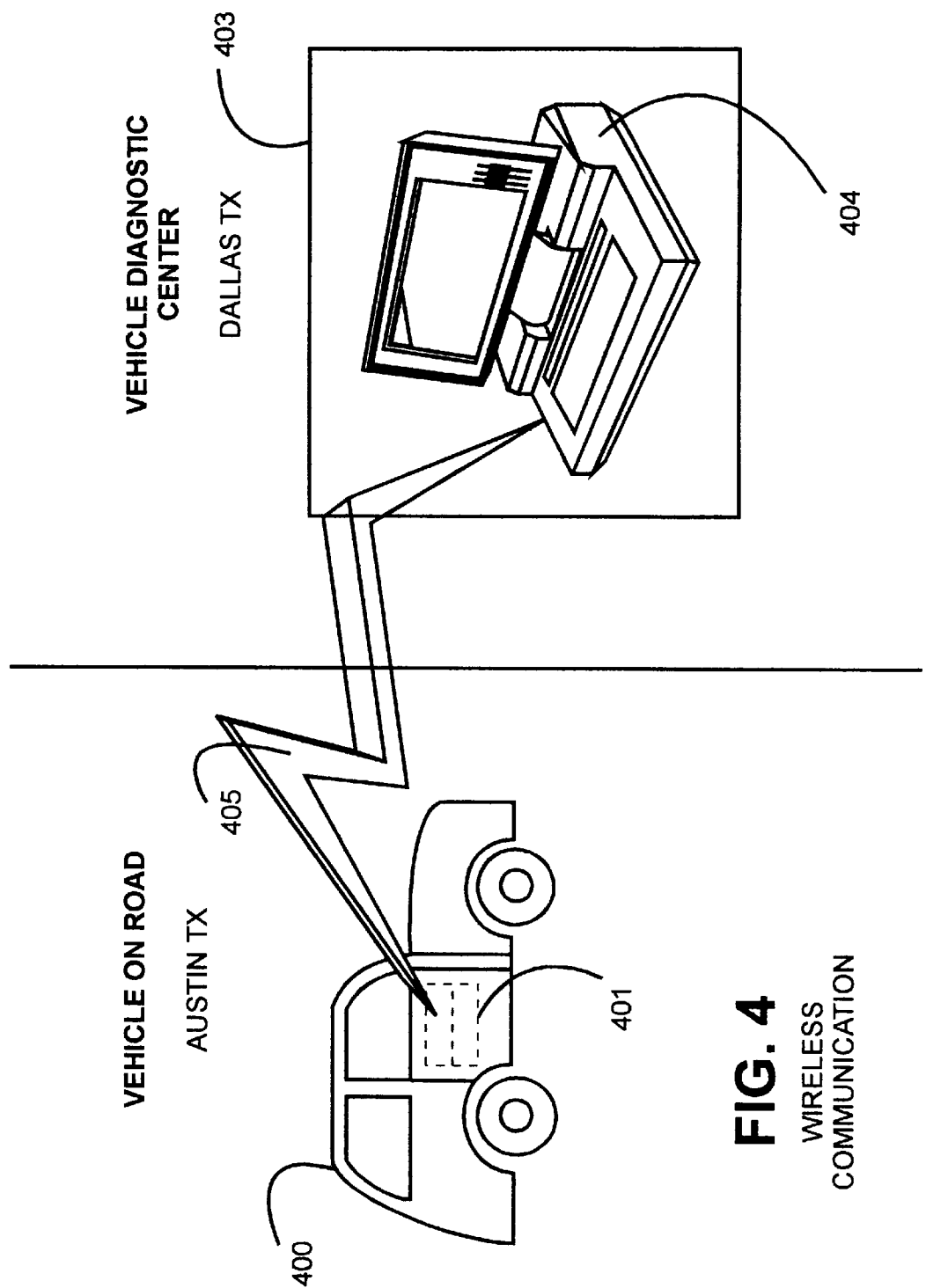
FIG. 4 is a representation of the wireless communication (such as a wireless modem) between a vehicle's computer or microprocessor in the vehicle, and the diagnostic center located in another location.

FIG. 4. as noted above, is a representation of the wireless communication between a vehicle's computer or microprocessor and the diagnostic center located in another location. FIG. 4 at 400 shows a typical vehicle, which may represent a car, truck, RV, farm vehicle. construction vehicle or even a motorcycle. The computer or microprocessor 401 is located within the interior or exterior of such a vehicle. A request for diagnostic analysis of a performance problem is sent from the vehicle at 405 via wireless communication to the diagnostic center 403, located in another location. In the current case, the vehicle, for example, is located in Austin, Texas, and the diagnostic center is located in Dallas, Texas. The wireless communication 405 connects with the diagnostic center's computer 404, which is programmed to analyze the information received from the vehicle 400. The diagnostic center's evaluation of the vehicle performance and suggested corrections are then sent back via the wireless communication 405 and received by the vehicle's computer or microprocessor at 401.

FIG. 5. as noted above, represents a typical wireless network demonstrating the various radio network access ports for the network. This could be a similar type of radio-type communication between the vehicle of the present invention at a 505 location with a desktop computer at the diagnostic center which might be at 504. Access ports to the radio network can be seen at 502, 501 and 503. Pen computer at 506 represents another type of computer that might be in another vehicle which employs radio network access to the wireless network. The network server, if required, is located at 507.

While the invention has been shown and described with reference to particular embodiments thereof, it will be understood by those skilled in the art that the foregoing and other changes in form and detail may be made therein without departing from the spirit and scope of the invention.

What is claimed is:

1. A method for performing diagnostic analysis on a vehicle, employing said vehicle's on-board computer; comprising the steps of:

providing computer communication and interaction between said vehicle's on-board computer and a diagnostic center's computer;

transmitting initial diagnostic information, from said vehicle's on-board computer, to said diagnostics center's computer, for advanced diagnostic analysis;

receiving in response to said transmission from said vehicle's on-board computer, to said diagnostic center's computer, advanced diagnostic routines for further processing by said vehicle's on-board computer;

repeating said transmission and said receiving process, until said vehicle's on-board computer determines that the desired diagnostic results are attained.

2. The method of claim 1 wherein said transmitting from said vehicle and said transmitting from said diagnostics center, are accomplished via any one of a wireless and wired communication means.

3. The method of claim 1 further comprising the step of:

self initiation by a server, connected to the diagnostic center's computer, for delivery of said diagnostic information to said vehicle's computer.

4. The method of claim 1 further comprising the steps of:

providing a docking station in said vehicle;

mounting a computer in said vehicle, employing said docking station; and employing said computer in said vehicle's docking station as said on-board computer, to perform the initial diagnostic evaluation before sending results to the diagnostic center's computer for advanced diagnostic analysis.

5. The method of claim 1 further comprising the steps of:

employing a portable PC in said vehicle as the on-board computer to perform initial diagnostic evaluation before sending results to the diagnostic center's computer for advanced diagnostic analysis; and interacting said portable PC in said vehicle, with said diagnostic center's computer system.

6. The method of claim 1 further comprising the steps of:

allowing progressively more said advanced diagnostics to request more complete analysis on certain parts of the vehicle; and pinpointing for said vehicle's on-board computer, problem areas as a result of said more advanced diagnostics.

7. A system for performing diagnostic analysis on a vehicle, employing said vehicle's on-board computer; comprising:

means for establishing computer communication and interaction, between said vehicle's on-board computer and a diagnostic center's computer;

means for transmitting initial diagnostic information from said vehicle's on-board computer, to said diagnostics center's computer, for further advanced diagnostic analysis; and receiving, in response, advanced diagnostic routines, from said diagnostic center's computer, for further processing by said vehicle's on-board computer; and means for repeating said transmission and said receiving process, until said vehicle's on-board computer determines that the desired diagnostic results are attained.

8. The system of claim 7 further comprising a means for providing more advanced diagnostic routines into said vehicle's on-board computer.

9. The system of claim 7 wherein said diagnostic information delivered to said vehicle, from said diagnostic center, occurs at the initiation of a server connected to the diagnostic center's computer.

10. The system of claim 7 wherein said on-board computer in said vehicle is employed in a docking station mounted in said vehicle.

11. The system of claim 7 further comprising means for providing advanced diagnostic routines, on demand, into said on-board computer, without the need to continually store said routines inboard said vehicle.

12. The system of claim 7 further comprising means for progressively performing more advanced diagnostics and to request more complete analysis on certain parts of said vehicle, in order to pinpoint problem areas.

13. A computer program product, having a programmable code included on a computer readable medium for, performing diagnostic analysis on a vehicle, employing said vehicle's own on-board computer; comprising:

means for establishing computer communication and interaction, between said vehicle's on-board computer and a diagnostic center's computer;

means for transmitting initial diagnostic information from said vehicle's on-board computer, to said diagnostics center's computer, for further advanced diagnostic analysis; and receiving, in response, advanced diagnostic routines, from said diagnostic center's computer, for further processing by said vehicle's on-board computer; and means for repeating said transmission and said receiving process, until said vehicle's on-board computer determines that the desired diagnostic results are attained.

14. The computer program product of claim 13 further comprising means for providing more advanced diagnostic routines into said vehicle's on-board computer.

15. The computer program product of claim 13 wherein said diagnostic information delivered to said vehicle, from said diagnostic center, occurs at the initiation of a server connected to said diagnostic center's computer.

16. The computer program product of claim 13 wherein said computer in said vehicle is employed using a docking station mounted in said vehicle.

17. The computer program product of claim 13 further comprising means for providing advanced diagnostic routines, on demand, to said vehicle's on-board computer without the need to continually store said routines inboard said vehicle.

18. The computer program product of claim 13 further comprising means for performing more advanced diagnostics and to request more complete analysis on certain parts of the vehicle, in order to pinpoint a specific problem.

* * * * *